March 21, 1961  R. C. UNDERWOOD, SR  2,975,542
ANIMAL TRAP
Filed Feb. 19, 1959  2 Sheets-Sheet 1

R. C. Underwood, Sr. INVENTOR

BY *C. A. Snow & Co.*

ATTORNEYS.

March 21, 1961  R. C. UNDERWOOD, SR  2,975,542
ANIMAL TRAP
Filed Feb. 19, 1959  2 Sheets-Sheet 2
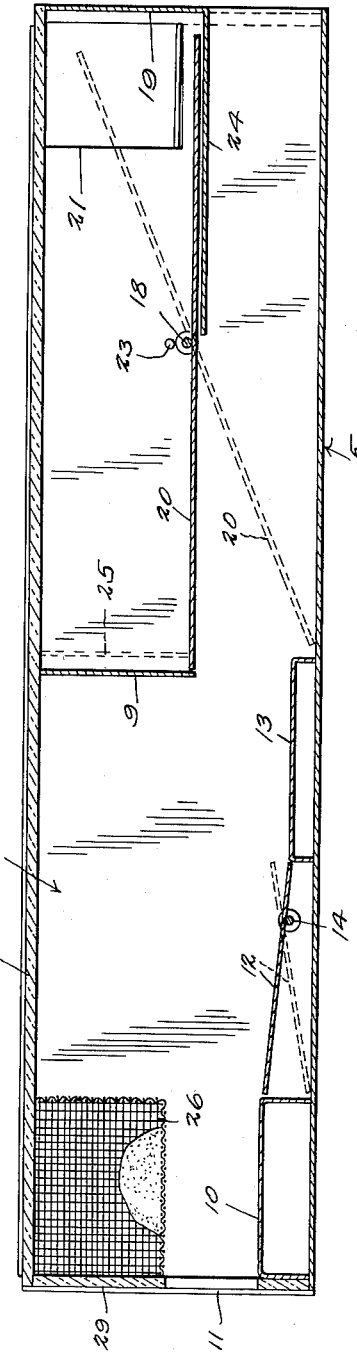
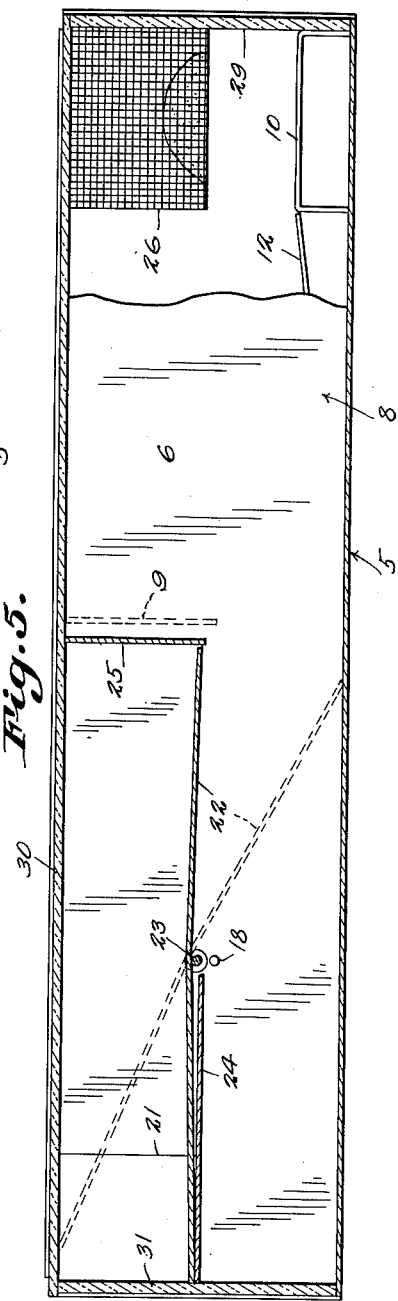
R.C. Underwood, Sr. INVENTOR
BY C.A. Snow & Co.
ATTORNEYS.

United States Patent Office 2,975,542
Patented Mar. 21, 1961

2,975,542
ANIMAL TRAP
Roland C. Underwood, Sr., Rte. 2, Killen, Ala.
Filed Feb. 19, 1959, Ser. No. 797,004
3 Claims. (Cl. 43—76)

This invention relates to animal traps, and more particularly to animal traps which are so constructed that they are automatically reset after an animal has been trapped therein to the end that it is possible to continuously trap animals, to the capacity of the retaining compartment thereof.

An important object of the invention is to provide a trap of this character wherein the trigger mechanism is disposed exteriorly of the trap so that it may be conveniently operated to reset the trap, when it is desired to place the trap in use.

Still another object of the invention is to provide a trigger mechanism which will be guarded against damage by animals trapped, attempting to escape.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 4 is a sectional view taken on line 4—4 of Fig. 1.

Figure 5 is a sectional view taken on line 5—5 of Fig. 1.

Figure 1:
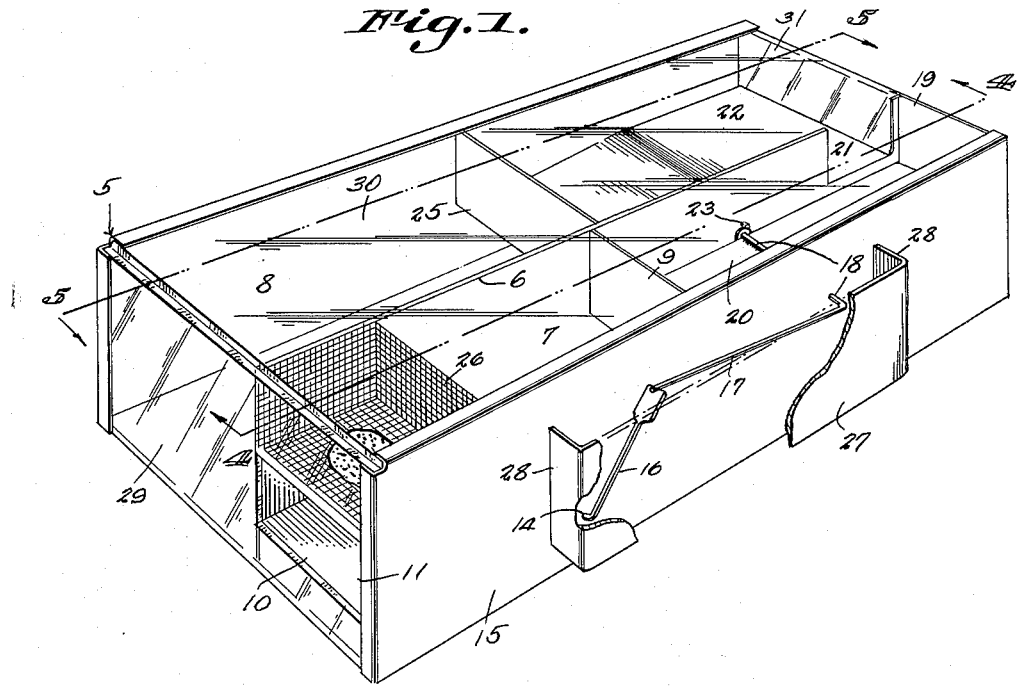
Figure 1 is a perspective view of an animal trap, constructed in accordance with the invention, illustrating the trap as set.
Figures 2, 3:
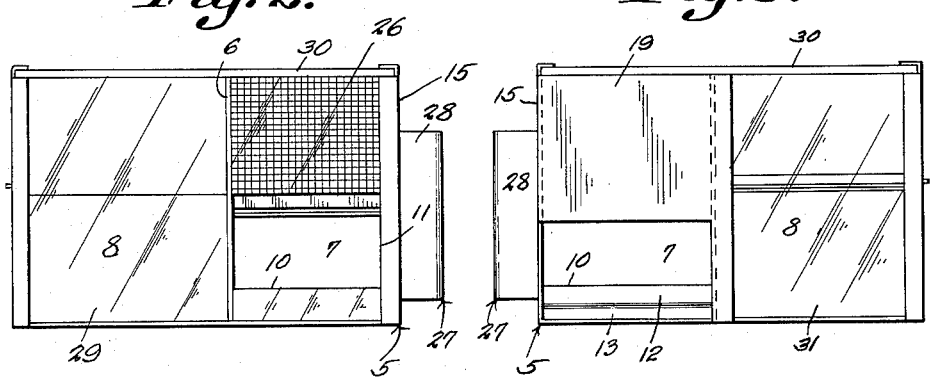
Figure 2 is a front end elevational view of the trap.
Figure 3 is a rear end elevational view of the trap.

Referring to the drawings in detail, the trap comprises an elongated box-like body portion indicated generally by the reference character 5 which is provided with a central longitudinally disposed partition 6 dividing the body portion into an elongated trapping compartment 7 and an elongated retaining compartment 8, that extend throughout the entire length of the body portion, the trapping compartment being narrow to prevent the animal entering the trapping compartment from turning around to escape through the entrance opening.

Dividing the elongated compartment 7 at a point substantially intermediate its ends, is a vertical partition 9 which has its lower edge spaced an appreciable distance from the bottom of the body portion, providing a passageway between the forward and rear ends of the elongated compartment 7. A stationary platform 10 is provided at the entrance opening 11 of the trap and directly at the rear edge of the platform 10, is a pivoted treadle 12 which is normally held in an inclined position, as shown by Fig. 4 of the drawings. A second stationary platform 13 is mounted within the compartment 7 and provides a continuation of the pivoted treadle.

As shown, the treadle 12 is secured to the shaft 14 that extends beyond the side wall 15 of the body portion, where it is provided with an elongated right angled end portion 16 wide at its extremity providing a contact surface for engagement by the free end of the arm 17 which forms a continuation of the shaft 18 that extends across the compartment 7, at a point between the partition 9 and rear end wall 19 of the body portion.

This shaft 18 supports the pivoted platform 20 which swings to its horizontal position, under the weight of the animal passing thereover, with the front edge thereof lying adjacent to the lower edge of the partition 9.

Thus it will be seen that due to this construction, when the arm 17 is moved to the position, as shown by Figure 1 of the drawings, where the arm 17 contacts the wide end of the arm 16, the pivoted treadle 12 is in a set position, and the pivoted platform 20 is in its horizontal or set position.

The partition 6 is provided with an opening 21 adjacent to the rear end thereof, which opening provides a passageway between the compartments 7 and 8.

As shown, a pivoted treadle 22 is secured to the shaft 23 that extends across the compartment 8, the treadle 22 being connected with the shaft at a point a short distance past the transverse center of the treadle so that under normal conditions it will automatically swing upwardly to its horizontal position due to the added weight of one end of the treadle over the other end thereof, the plate 24 mounted directly thereunder at the rear end of the treadle, restricting downward movement of the rear end of the treadle 22 under the weight of the animal passing into the compartment 8.

Disposed within the compartment 8, dividing the compartment 8 into front and rear compartments, is the partition 25 which has its lower edge spaced an appreciable distance above the bottom of the compartment 8 providing a passageway when the forward end of the pivoted treadle 22 moves downwardly under the weight of the animal, for the animal to pass into the forward end of the compartment 8.

The bait receptacle is indicated by the reference character 26 and is so located at the front end of the body portion that it will attract animals to the trap. The bait receptacle has its bottom spaced an appreciable distance from the stationary platform 10, to provide ample space for the animal to enter the trap directly under the bait receptacle.

In order that the trigger mechanism which includes the arms 16 and 17 and shaft 18, will be protected against damage by falling sticks, stones or animals passing in proximity thereto, a guard indicated by the reference character 27 is provided, which guard is in the form of a wide plate with inwardly extended ends 28 secured to the outer surface of the side wall 15 providing a compartment between the guard 27 and the wall permitting free movement of the trigger mechanism. The upper portion of the compartment in which the trigger mechanism is mounted, is left open, so that easy access may be had to the elements should it be desired to set the trap.

The front wall of the trap is constructed preferably of glass indicated at 29, while the top of the trap which is also glass is indicated by the reference character 30. The rear wall 31 of the compartment 8 is also glass, to permit the animals trapped, to be viewed therethrough. This rear wall is mounted in suitable guideways so that it may be elevated to permit of removal of the trapped animals.

The operation of the trap is as follows:

An animal entering the entrance opening of the trap will step on the treadle 12 which will overbalance the treadle, moving the right angled end or arm 16 upwardly out of contact with the arm 17. As the arm 17 swings downwardly under its weight, the pivoted platform 20 will swing downwardly to the position shown in dotted lines in Figure 4 of the drawings. The animal in an attempt to pass from the compartment 7, will pass over the platform 20 and will then move through the opening 21 and pass onto the pivoted treadle 22. As the animal moves forwardly on the treadle 22, the forward end of the treadle 22 will swing downwardly to the position shown by Fig. 5 of the drawings and the animal will pass into the forward end of the compartment 8. As the weight of the animal leaves the treadle 22, it will swing to the position shown in full lines in Fig. 5 and the animal will now be trapped in the compartment 8.

Immediately upon the animal passing over the treadle 12, and onto the elevated end of the platform 20, the platform will be elevated to its horizontal position, with the result that the arm 17 will swing upwardly past the wide end of the arm or right angled end 16 of the shaft 14. As the animal leaves the platform 20, the arm 17 will drop downwardly onto the wide end of the member 16, re-setting the trap automatically.

Due to the fact that the trap automatically resets itself, it will be obvious that the trap will operate to trap animals until the compartment 8 becomes filled to its capacity.

Having thus described the invention, what I claim is:

1. An animal trap comprising a body portion having communicating trapping and retaining compartments, said body portion having a front and rear wall, side walls and a floor, a treadle pivotally mounted adjacent the floor of the trapping compartment, a shaft on which the treadle is secured, said shaft extending through a wall of the body portion and being extended upwardly, a partition extending across the trapping compartment having a lower edge spaced from the floor thereof, a pivoted platform mounted between the rear wall of the body portion and lower edge of the partition, said platform being adapted to swing downwardly from a substantially horizontal set position to an inclined position over which animals in moving to the retaining compartment pass, a shaft on which the pivoted platform is secured, one end of the shaft extending through a wall of the body portion and engaging the upper end of the upwardly extending portion of the treadle shaft normally holding the pivoted platform in said set position, and a guard extending along the outer surface of the body portion, guarding the portions of said shafts extending through the body portion.

2. An animal trap comprising a body portion having communicating trapping and retaining compartments, said body portion having a front and rear wall, side walls and a floor, a pivoted treadle operating adjacent the floor of the trapping compartment, a shaft to which the treadle is secured, having a right angled end portion extending through one wall of the body portion, said right angled end portion being normally inclined rearwardly, a pivoted platform mounted within the trapping compartment, a shaft to which the platform is connected to overbalance the platform, the platform shaft extending through the wall of the body portion and being inclined forwardly resting on the free end of the right angled portion of the treadle shaft, to support the platform in a horizontal set position, said treadle being movable downwardly under the weight of an animal releasing the right angled portion of the treadle shaft and the forwardly inclined portion of the shaft on which the platform is mounted, the platform moving to an inclined position over which an animal moves to the retaining compartment, and said forwardly inclined portion of the shaft on which the platform is mounted being adapted to swing upwardly past the right angled portion of the treadle shaft and rest on the upper edge thereof, holding the platform in said set position.

3. An animal trap comprising a body portion having side walls, a partition extending longitudinally of the body portion dividing the body portion into a trapping compartment and a retaining compartment, said partition having an opening establishing communication between the compartments, partitions within the compartments dividing the compartments into front and rear sections, a treadle in the front section of one compartment, a pivoted platform mounted within the rear section thereof, a shaft on which the treadle is secured, one end of the shaft extending through one side wall of the body portion, a shaft on which the pivoted platform is secured, said shaft terminating in an arm extending through one side wall of the body portion, said arm extending forwardly resting on the free end of the treadle shaft exteriorly of the body portion normally holding the pivoted platform in a horizontal position, and said treadle being adapted to move downwardly under the weight of an animal thereon, moving the treadle shaft to disengage the treadle shaft and pivoted platform arm, whereby said platform swings downwardly to an inclined position and over which animals pass in moving through the trap.

No references cited.